(12) United States Patent
Takahashi et al.

(10) Patent No.: US 9,316,289 B2
(45) Date of Patent: Apr. 19, 2016

(54) CROWN GEAR DECELERATION MECHANISM

(71) Applicant: NATIONAL UNIVERSITY CORPORATION FUKUSHIMA UNIVERSITY, Fukushima-shi, Fukushima (JP)

(72) Inventors: Takayuki Takahashi, Miyagi (JP); Hiroyuki Sasaki, Yamagata (JP)

(73) Assignee: NATIONAL UNIVERSITY CORPORATION FUKUSHIMA UNIVERSITY, Fukushima (JP)

( * ) Notice: Subject to any disclaimer, the term of this patent is extended or adjusted under 35 U.S.C. 154(b) by 0 days.

(21) Appl. No.: 14/376,095

(22) PCT Filed: Nov. 13, 2012

(86) PCT No.: PCT/JP2012/079429
§ 371 (c)(1),
(2) Date: Jul. 31, 2014

(87) PCT Pub. No.: WO2014/076771
PCT Pub. Date: May 22, 2014

(65) Prior Publication Data
US 2015/0024896 A1  Jan. 22, 2015

(51) Int. Cl.
*F16H 1/32* (2006.01)
(52) U.S. Cl.
CPC . *F16H 1/32* (2013.01); *F16H 1/321* (2013.01)
(58) Field of Classification Search
CPC ............ F16H 1/32; F16H 1/321; Y10T 74/19
USPC ...................... 74/640; 475/162, 163, 164, 180
See application file for complete search history.

(56) References Cited

U.S. PATENT DOCUMENTS

| 1,582,075 | A | * | 4/1926 | Page | ........................ | B66D 1/22 |
| | | | | | | 254/342 |
| 4,946,428 | A | * | 8/1990 | Barozzi | .................... | F16H 1/321 |
| | | | | | | 475/164 |

(Continued)

FOREIGN PATENT DOCUMENTS

| JP | 60-169449 U | 11/1985 |
| JP | 2000-205351 A | 7/2000 |

(Continued)

OTHER PUBLICATIONS

International Search Report for the Application No. PCT/JP2012/079429 mailed Feb. 12, 2013.

*Primary Examiner* — Jacob S Scott
(74) *Attorney, Agent, or Firm* — Cheng Law Group, PLLC

(57) ABSTRACT

A crown gear deceleration mechanism provided by the present invention includes: a stator including a crown gear; a rotor including another crown gear; and an output shaft coupled to the rotor. Stator includes a stator tooth row in which $N_{1S}$ stator teeth are circularly arranged. Rotor includes: a first rotor tooth row in which $N_1$ teeth are arranged; and a second rotor tooth row in which $N_2$ teeth are arranged. Output shaft includes an output tooth row in which $N_{2S}$ teeth are arranged. Rotor performs a precession while engaging the first rotor tooth row with the stator tooth row at places existing at both sides between which a devotion central line intervenes. Rotor transmits rotation to the output shaft while engaging the second rotor tooth row with the output tooth row at the places existing at both sides between which the devotion central line intervenes.

12 Claims, 14 Drawing Sheets

(56) References Cited

U.S. PATENT DOCUMENTS

| | | | |
|---|---|---|---|
| 5,954,610 A * | 9/1999 | Kamimura | B23F 5/02 409/51 |
| 2011/0108356 A1 * | 5/2011 | Otsuki | F16H 1/321 74/416 |
| 2011/0162471 A1 | 7/2011 | Takahashi et al. | |

FOREIGN PATENT DOCUMENTS

| | | |
|---|---|---|
| JP | 4511635 B1 | 7/2010 |
| JP | 2012-2237 A | 1/2012 |
| JP | 5054853 B1 | 8/2012 |
| WO | WO-2012/153422 A1 | 11/2012 |

* cited by examiner

CROWN GEAR DECELERATION MECHANISM

TECHNICAL FIELD

The present invention relates to a crown gear deceleration mechanism that is configured to transmit rotation by engagement between crown gears.

BACKGROUND ART

The inventors have proposed a crown gear deceleration mechanism that has a constitution shown in FIG. 25 as a deceleration mechanism capable of realizing high reduction ratio and low backlash, although it is a simple structure.

As disclosed also in JP 4511635 B2, this crown gear deceleration mechanism includes a stator 102 and a rotor 104. The stator 102 is a crown gear that is fixed to an external member. The rotor 104 is another crown gear that is different from the stator 102. Then, the rotor 104 is pressed to a side of the stator 102 with a pressing mechanism 106 operated so as to rotate around an axis. The rotor 104 is engaged with the stator 102. In this case, both of teeth of the rotor 104 and teeth of the stator 102 have been set so that the rotor 104 inclines slightly to the stator 102 and engagement parts are distributed to two places existing at both sides between which a devotion center line intervenes. The rotor 104 is coupled to an output shaft 112 through flexible spokes 108 and a hub 110.

In the crown gear deceleration mechanism that includes the above-mentioned configuration, the pressing mechanism 106 is rotated with power of a motor or the like. Therefore, the rotor 104 performs a precession while moving, in a circumferential direction, the parts where the rotor 104 is engaged with the stator 102. Rotation is transmitted to the output shaft 112 from the rotor 104 while each spoke 108 deforms elastically in connection with this precession. Therefore, the rotation input into the pressing mechanism 106 is outputted at high reduction ratio through the output shaft 112. Further, according to the crown gear deceleration mechanism, because the teeth are constantly engaged with each other at each of the two places of both sides, the low backrush is realized.

Furthermore, in a crown gear deceleration mechanism disclosed in JP 5054853 B2, an elastic disc is provided between a rotor and an output shaft, and then the rotor is coupled to the output shaft. In this crown gear deceleration mechanism, when the rotor performs a precession, the elastic disk transmits rotation to the output shaft while elastically deforming.

DISCLOSURE OF INVENTION

As described above, in the conventional crown gear deceleration mechanism, the elastic member is provided between the rotor and the output shaft, and then the rotor is coupled to the output shaft so as to be capable of transmitting the rotation. Therefore, there is a problem in that it is hard to enhance strength, rigidity, and durability as a whole mechanism.

The present invention has been made in the light of the above-mentioned problem, and it is an object thereof to more enhance strength, rigidity, and durability of a crown gear deceleration mechanism.

Then, to solve the above-mentioned problem, the present invention provides a crown gear deceleration mechanism including configuration described below.

The present invention provides a crown gear deceleration mechanism. The crown gear deceleration mechanism includes a stator, a rotor and an output shaft. The stator includes a crown gear. The rotor includes another crown gear that is located so as to be inclined to the crown gear. The output shaft is coupled to the rotor. The stator includes a stator tooth row in which $N_{1S}$ stator teeth are circularly arranged. The rotor includes: a first rotor tooth row in which $N_1$ first rotor teeth are circularly arranged; and a second rotor tooth row in which $N_2$ second rotor teeth are circularly arranged. The output shaft includes an output tooth row in which $N_{2S}$ output teeth are circularly arranged. The rotor is configured to perform a precession while engaging the first rotor tooth row with the stator tooth row at places existing at both sides between which a devotion central line of the rotor intervenes. The rotor is configured to transmit rotation to the output shaft while engaging the second rotor tooth row with the output tooth row at the places existing at both sides between which the devotion central line intervenes.

In the crown gear deceleration mechanism according to the present invention, preferably, a combination of $(N_1-N_{1S}, N_2-N_{2S})$ is any one of $(1, 1)$, $(1, 0)$, $(1, -1)$, $(0, 1)$, $(0, -1)$, $(-1, 1)$, $(-1, 0)$, and $(-1, -1)$.

Preferably, the combination of $(N_1-N_{1S}, N_2-N_{2S})$ is any one of $(1, 0)$, $(0, 1)$, $(0, -1)$, and $(-1, 0)$.

Preferably, the first rotor teeth and the second rotor teeth project from the rotor in a same direction.

In this case, preferably, a combination of $(N_1-N_{1S}, N_2-N_{2S})$ is any one of $(1, 0)$, $(1, -1)$, $(0, 1)$, and $(-1, 1)$.

More preferably, the combination of $(N_1-N_{1S}, N_2-N_{2S})$ is $(1, 0)$ or $(0, 1)$.

Preferably, the first rotor teeth and the second rotor teeth project from the rotor in a mutually opposite direction.

In this case, preferably, a combination of $(N_1-N_{1S}, N_2-N_{2S})$ is any one of $(1, 1)$, $(0, -1)$, $(-1, 0)$, and $(-1, -1)$.

More preferably, the combination of $(N_1-N_{1S}, N_2-N_{2S})$ is $(0, -1)$ or $(-1, 0)$.

In the crown gear deceleration mechanism according to the present invention, preferably, the rotor is configured to perform the precession while engaging at least two of the first rotor teeth with the stator tooth row at each of the places existing at both sides between which the devotion central line of the rotor intervenes.

Preferably, the rotor is configured to transmit the rotation to the output shaft while engaging at least two of the second rotor teeth with the output tooth row at each of the places existing at both sides between which the devotion central line intervenes.

Preferably, the rotor is configured to perform the precession while engaging at least two of the first rotor teeth with the stator tooth row at each of the places existing at both sides between which the devotion central line of the rotor intervenes. In this case, preferably, the rotor is configured to transmit the rotation to the output shaft while engaging at least two of the second rotor teeth with the output tooth row at each of the places existing at both sides between which the devotion central line intervenes.

Preferably, the stator tooth row is formed to be engaged with the first rotor tooth row so that a difference in teeth number between the stator tooth row and the first rotor tooth row is zero, or the output tooth row is formed to be engaged with the second rotor tooth row so that a difference in teeth number between the output tooth row and the second rotor tooth row is zero.

DESCRIPTION OF EMBODIMENTS

Figure 1:
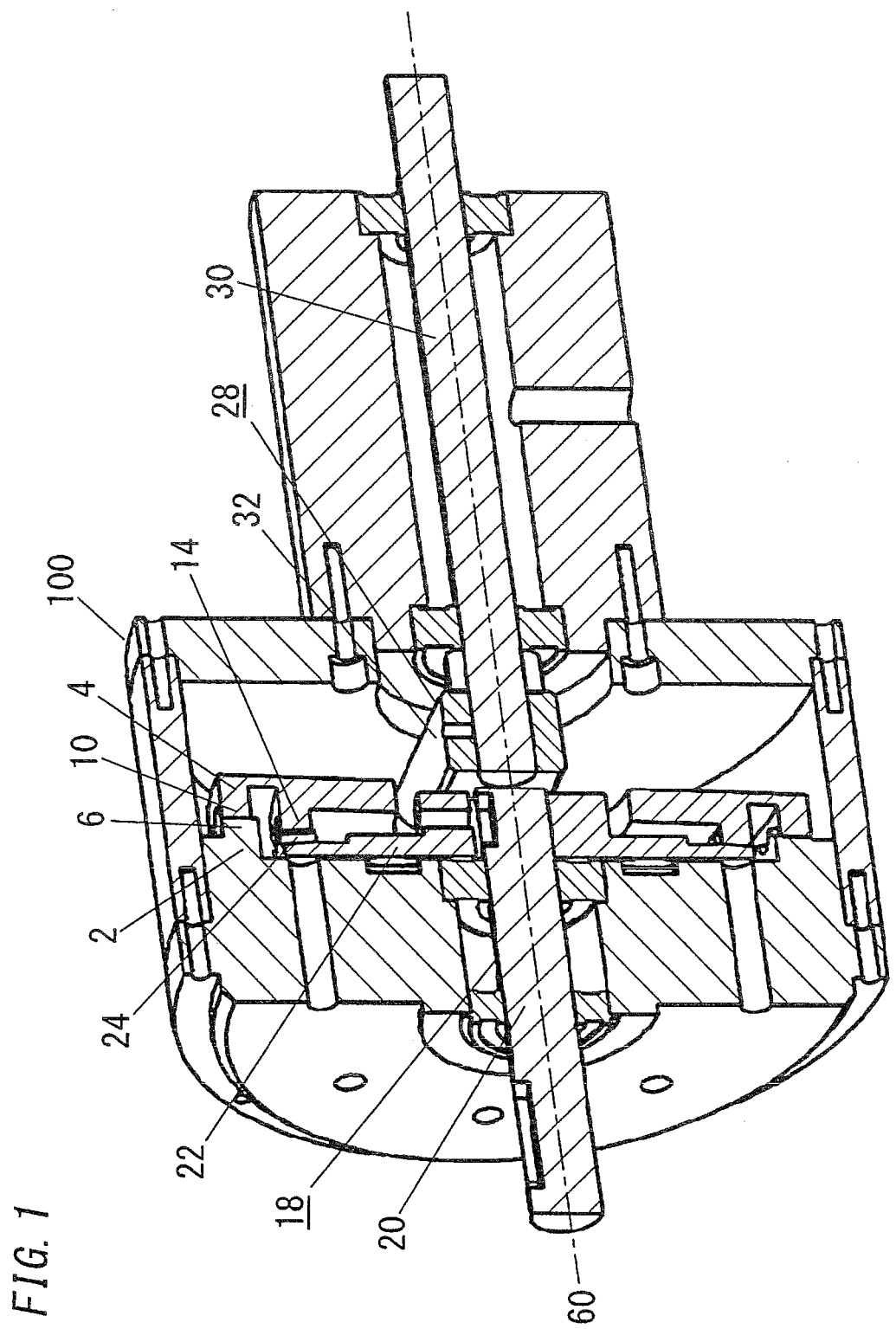
FIG. 1 is a cutaway perspective view of a crown gear deceleration mechanism according to one embodiment of the present invention.
Figure 2:
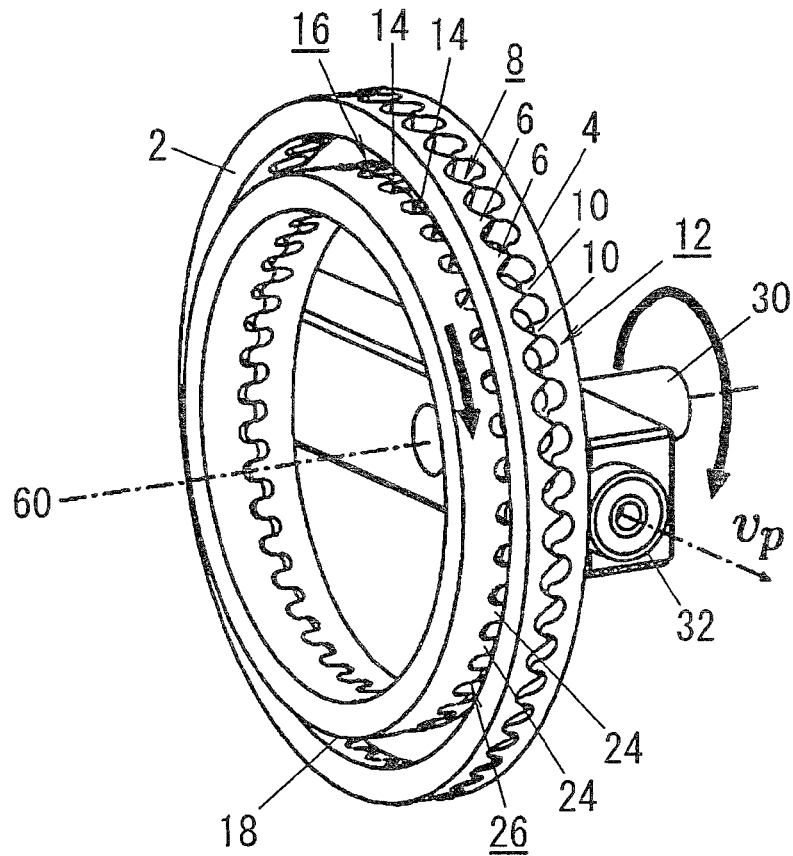
FIG. 2 is a perspective view of a main part of the crown gear deceleration mechanism.
Figure 3:
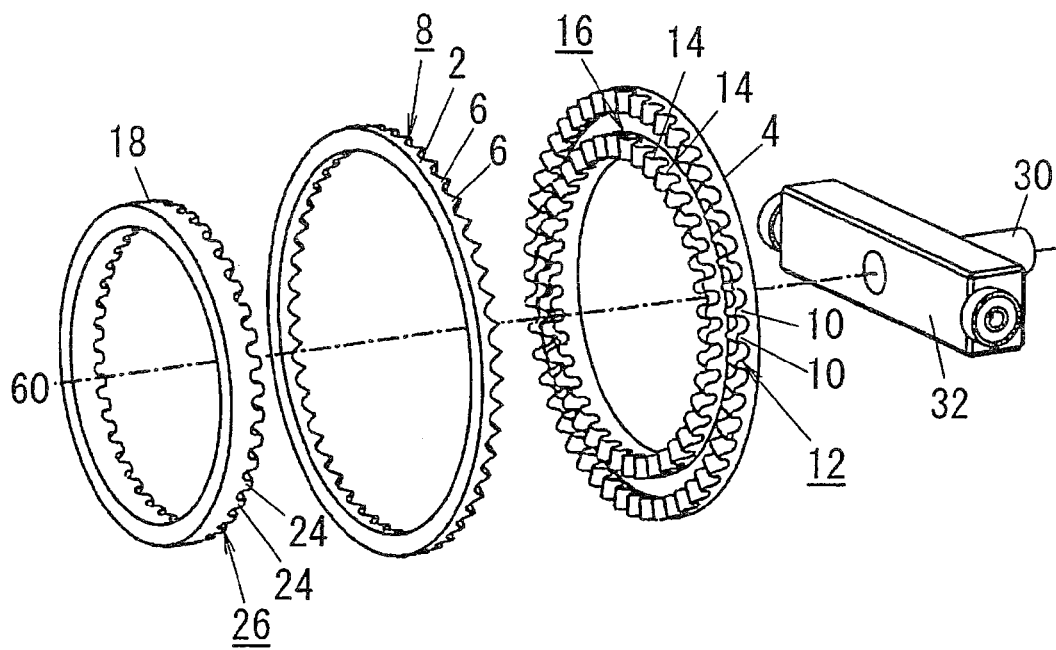
FIG. 3 is an exploded perspective view of the main part.

The present invention will be described based on an embodiment shown in the accompanying drawings. FIG. 1 shows a crown gear deceleration mechanism according to one embodiment of the present invention. FIGS. 2 and 3 show a main part of the crown gear deceleration mechanism.

The crown gear deceleration mechanism according to the present embodiment includes a stator 2 and a rotor 4. The stator 2 includes a fixed-side crown gear. The rotor 4 includes a movable-side crown gear performing a precession while being engaged with the stator 2. The stator 2 is fixed and arranged to a housing 100. The rotor 4 is arranged so as to be opposite to the stator 2 in the housing 100.

As shown in FIGS. 2 and 3, the stator 2 includes a plurality of stator teeth 6. The plurality of stator teeth 6 are circularly arranged on a surface of the stator 2, which is facing a side of the rotor 4. Here, $N_{1S}$ stator teeth 6 are arranged in a circumferential direction of the stator 2, and then a stator tooth row 8 is constituted of the $N_{1S}$ stator teeth 6.

The rotor 4 includes both of a first rotor tooth row 12 and a second rotor tooth row 16. The first rotor tooth row 12 and the second rotor tooth row 16 are provided on a surface of the rotor 4, which is facing a side of the stator 2. The first rotor tooth row 12 includes a plurality of first rotor teeth 10. The second rotor tooth row 16 includes a plurality of second rotor teeth 14. The first rotor tooth row 12 is formed so that $N_1$ rotor teeth 10 are circularly arranged. The second rotor tooth row 16 is formed so that $N_2$ second rotor teeth 14 are circularly arranged. The first rotor tooth row 12 and the second rotor tooth row 16 are located concentrically on an opposite surface of the rotor 4. The second rotor tooth row 16 is located inside the first rotor tooth row 12. The rotor 4 is formed into a ring shape as seen from an axis direction of a central axis 60. Each first rotor tooth 10 of the first rotor tooth row 12 projects from an outer periphery edge of the rotor 4, and each second rotor tooth 14 of the second rotor tooth row 16 projects from an inner periphery edge of the rotor 4.

As shown in FIG. 1, an output shaft 18 includes a cylindrical shaft part 20 and a gear part 22. The gear part 22 is jointed to one end part of the shaft part 20. One end side of the shaft part 20 is located in the housing 100, and the other end side of the shaft part 20 is located out of the housing 100 so as to project. The gear part 22 includes a crown gear in which a plurality of output teeth 24 are circularly arranged. Here, $N_{2S}$ output teeth 24 are arranged in a circumferential direction, and an output tooth row 26 is constituted of the $N_{2S}$ output teeth 24. The gear part 22 of the output shaft 18 is located at inside of the stator 2 in the housing 100. The output tooth row 26 of the output shaft 18 is located concentrically with the stator tooth row 8 as seen from the axis direction of the central axis 60.

A pressing mechanism 28 is pressed to a surface of the rotor 4, which is opposite of a surface provided with the first rotor tooth row 12 and the second rotor tooth row 16. The pressing mechanism 28 includes an input shaft 30 and a press rotor 32. The input shaft 30 is operated so as to be rotated by a motor that is not shown. The press rotor 32 is attached to a tip of the input shaft 30. One end side of the input shaft 30 is located in the housing 100, and the other end side of the input shaft 30 is located out of the housing 100 so as to project.

The rotor 4, which is pressed to the stator 2 through the press rotor 32, is engaged with the stator 2 while keeping a state in which the rotor 4 slightly inclines in one direction. Further, the rotor 4 is engaged with the gear part 22 of the output shaft 18. When the input shaft 30 is made to rotate while this state is kept, and then the press rotor 32 is made to rotate around the central axis 60, the rotor 4 performs a precession by engaging the first rotor tooth row 12 with the stator tooth row 8. Further, the output tooth row 26 is engaged with the second rotor tooth row 16 that is included in the rotor 4 performing the precession. Therefore, the output shaft 18 is rotated around the central axis 60.

In this case, when a rotation angle of the output shaft 18 and a rotation angle of the input shaft 30 are respectively set to $\theta_o$ and $\theta_i$, reduction ratio is obtained from a relationship expressed in expression (1).

[Expression 1]

$$\frac{\theta_o}{\theta_i} = 1 - \frac{N_2 N_{1s}}{N_{2s} N_1} \qquad (1)$$

In the present embodiment, $N_1$, $N_{1S}$, $N_2$, and $N_{2S}$ are respectively set to 50, 49, 40, and 40, and then the reduction ratio becomes 50. That is, a difference in teeth number $N_1-N_{1S}$ between the first rotor tooth row 12 and the stator tooth row 8 that are engaged with each other is 1. A difference in teeth number $N_2-N_{2S}$ between the second rotor tooth row 16 and the output tooth row 26 is 0. In any engagements, a plurality of teeth of each component of the rotor 4, the stator 2, and the output shaft 18 are designed so that at least two teeth of one component are engaged with at least two teeth of another component at each of places existing at both sides between which the devotion central line of the rotor 4 intervenes.

The following specifically describes a generation method of these tooth profiles.

Figure 4:
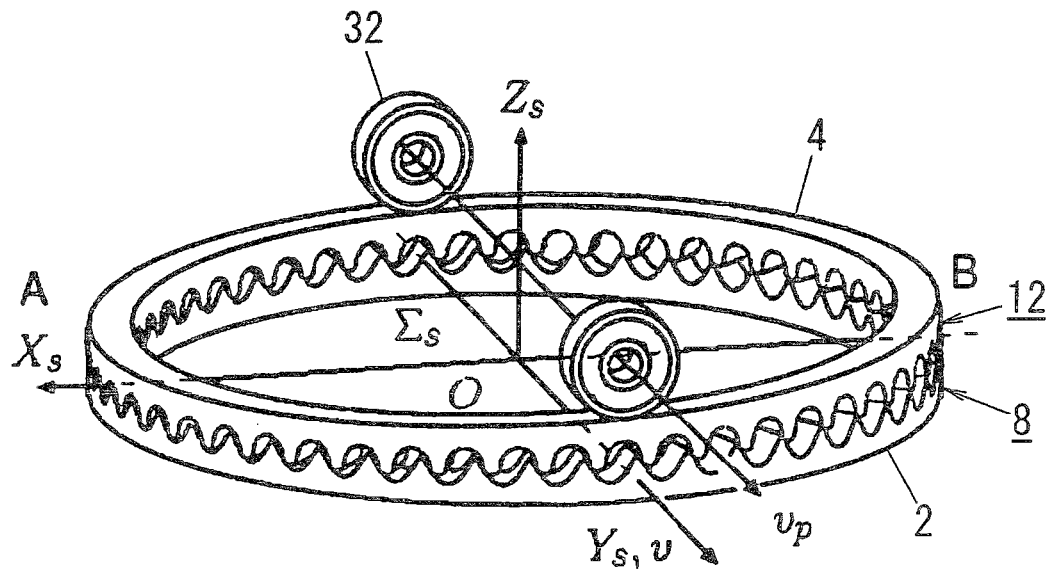
FIG. 4 is a perspective view illustrating a relationship between a stator and a rotor in the crown gear deceleration mechanism.

First, a generally motion of the rotor 4 is expressed in the crown gear deceleration mechanism. FIG. 4 shows a relationship between a vector $v_p$ of an axis of the press rotor 32 attached to the input shaft 30 and a coordinate system $\Sigma_s$ fixed to the stator 2. A vector v is a vector generated by mapping the vector $v_p$ to an $X_S$-$Y_S$ plane. FIG. 4 shows the case of $\theta_i=0$, and $\theta_o=0$ for simplification, in which v agrees with $Y_S$.

Figure 5:
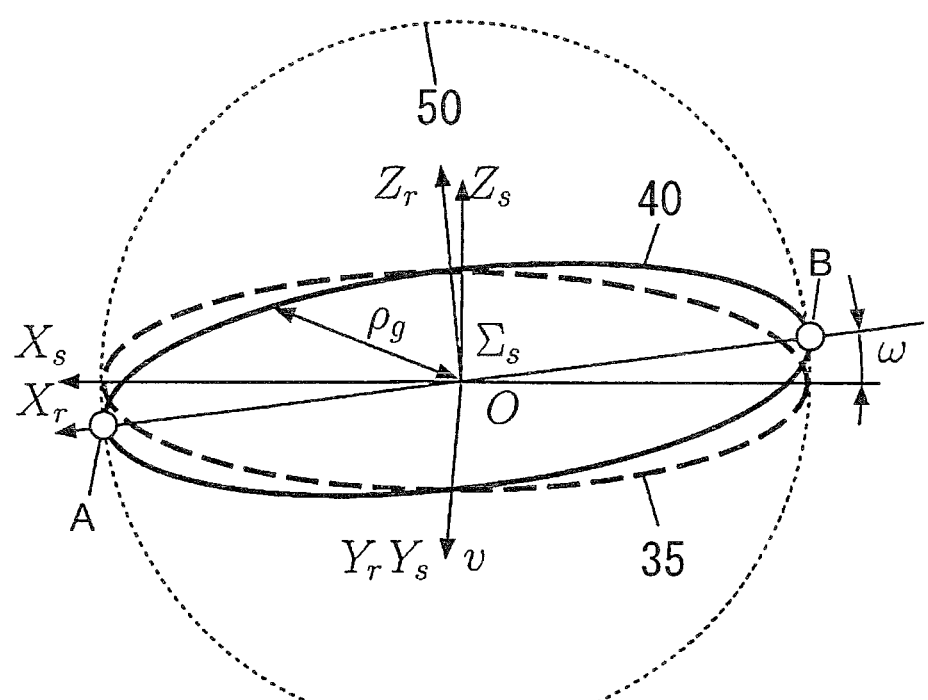
FIG. 5 is a drawing illustrating an engaging model between the stator and the rotor.

FIG. 5 shows a model for analyzing the stator 2 and the rotor 4. In this drawing, v agrees with $Y_S$. A solid-line circle in the drawing is a reference circle 40 of the rotor 4, and a broken-line circle is a reference circle 35 of the stator 2. Radiuses of any reference circles are set to $\rho_g$. A coordinate system fixed to the rotor 4 is set to $\Sigma_r$. The coordinate systems $\Sigma_S$ and $\Sigma_r$ have origins that agree with each other, and the origins are set to O. A reference spherical surface 50 is a spherical surface that has O as a center point and the radius $\rho_g$.

In this case, the rotor 4 inclines at an angle ω around the vector v, and the devotion central line of the rotor 4 is changed with the rotation angle $\theta_i$ of the input shaft 30. The devoting central line is a line segment AB in the drawing. A is a point at which the rotor 4 is pressed to the stator 2 most deeply. B is a point at which the rotor 4 rises so as to be farthest from the stator 2. For this reason, the line segment jointing the point A and the point B, which are located on the reference circle 40 of the rotor 4, agrees with the devoting central line of the rotor 4.

When points on the rotor 4 as seen from $\Sigma_r$ are set to $^rP_r$, and points on the rotor 4 as seen from $\Sigma_s$ are set to $^SP_r$, a relationship therebetween is expressed in the following expression (2).

$$^SP_r = R_z(\theta_o)R_L(v,\omega)^rP_r \qquad [\text{Expression 2}]$$

$R_z(\theta_o)$ in the expression (2) is a rotation matrix around $Z_s$. $R_L(v, \omega)$ in the expression (2) is a rotation matrix for rotating ω times around the vector v and is generally called an expression of finite rotation (a Rodrigues rotation formula). To organize above description, a relationship expressed in the following expression (3) is obtained.

[Expression 3]

$$R_z(\theta_o)R_L(v,w) = \begin{pmatrix} g_{11} & g_{12} & g_{13} \\ g_{21} & g_{22} & g_{23} \\ g_{31} & g_{32} & g_{33} \end{pmatrix} \qquad (3)$$

$g_{11} = (1-C_\omega)S_{io}S_i + C_oC_\omega$
$g_{12} = -(1-C_\omega)C_{io}S_i - S_oC_\omega,\ g_{13} = S_\omega C_i$
$g_{21} = -(1-C_\omega)S_{io}C_i + S_oC_\omega$
$g_{22} = (1-C_\omega)C_{io}C_i + C_oC_\omega,\ g_{23} = S_\omega S_i$
$g_{31} = -S_\omega C_{io},\ g_{32} = -S_\omega S_{io},\ g_{33} = C_\omega$ Here, $\cos\theta_o$, $\sin\theta_o$, $\cos\omega$, and sing are respectively abbreviated to $C_o$, $S_o$, $C_\omega$, and $S_\omega$. In addition, $\theta_i-\theta_o$, $\cos\theta_{io}$, and $\sin\theta_{io}$ are respectively abbreviated to $\theta_{io}$, $C_{io}$, and $S_{io}$.

From the above, the transformation matrix of the expression (2) can be expressed with $\theta_i$, $\theta_o$, and ω. This is an expression expressing general motion of the rotor 4.

Next, the following describes a method for forming the stator tooth row 8. Here, the stator tooth row 8 is formed along a path of the first rotor tooth row 12 when the rotor 4 performs the precession. A cone model shown in FIG. 6 is used as a model of each first rotor tooth 10 constituting the first rotor tooth row 12.

Figure 6:
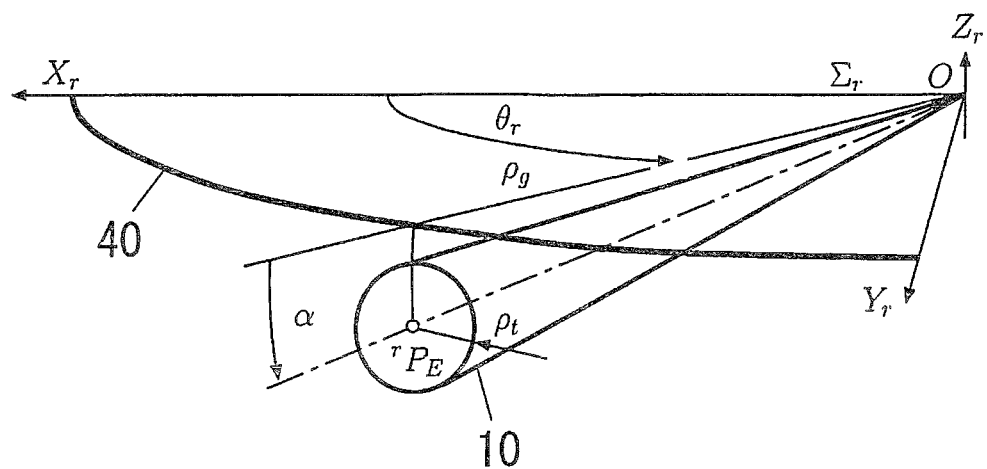
FIG. 6 is a drawing illustrating a conic model of a rotor tooth.

As shown in FIG. 6, a radius and a central point of a bottom of a cone being the first rotor tooth 10 are respectively set to $\rho_t$ and $'P_E$. A height of the cone agrees with the radius $\rho_g$ of the reference circle 40. A position of $'P_E$ is expressed in the following expression (4) with a polar coordinate $(\theta_r, \alpha, \rho_g)$.

[Expression 4]

$$^rP_E = \rho_g \begin{pmatrix} \cos\theta_r \cos\alpha \\ \sin\theta_r \cos\alpha \\ -\sin\alpha \end{pmatrix} \qquad (4)$$

$\theta_r$ is expressed in the following expression (5). In this case, N in the expression is set to $N_1$. α is a constant number expressing to have flexibility in design.

[Expression 5]

$$\theta_r = \frac{2\pi}{N} j, \qquad (5)$$
$$(j = 0, 1, 2 \ldots, N-1)$$

Figure 7:
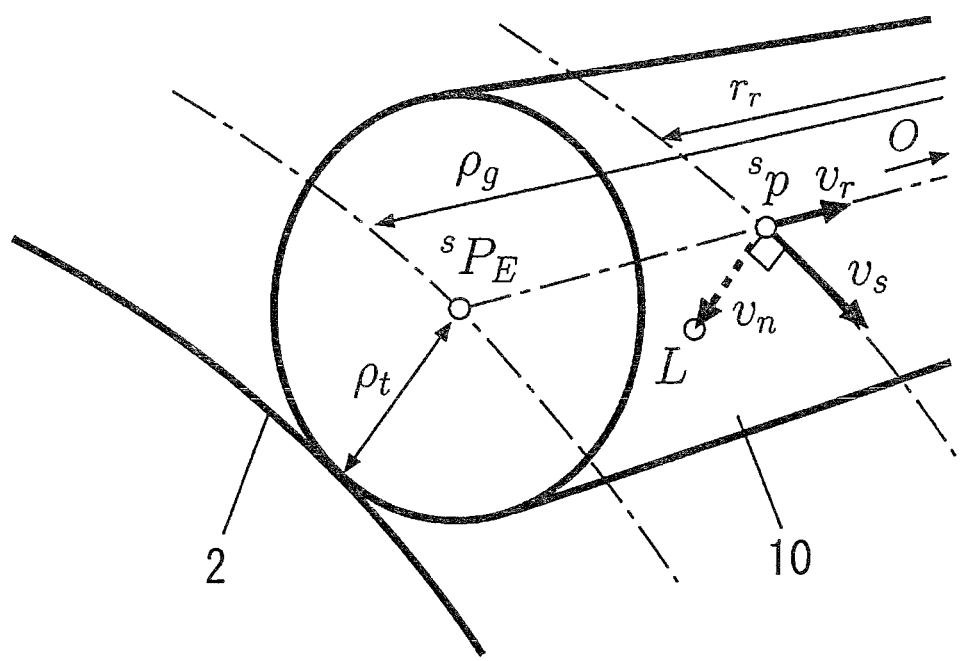
FIG. 7 is a drawing illustrating a relationship between a rotor tooth and the stator.

The stator tooth row 8 includes an envelope that makes contact with a surface family of the cone moving when $\theta_i$ is changed. FIG. 7 shows this condition. A point on a line segment $'R_EO$ separated from the origin O by the radius $r_r$ is set to $^Sp$. A vector from $^Sp$ in an origin direction is set to $v_r$. A motion vector of $^Sp$ according to change of $\theta_i$ is set to $v_S$. A normal vector determined from an outer product of $v_r$ and $v_S$ is set to $v_n$. Because the radius of the first rotor tooth 10 is set to $\rho_t r_r/\rho_g$ when the radius is $r_r$, a curved surface of the stator tooth row 8 is expressed in the following expression (6).

[Expression 6]

$$L(\theta_i, r_r) = \frac{\rho_t r_r}{\rho_g} \frac{v_n(\theta_i, r_r)}{|v_n(\theta_i, r_r)|} + {}^Sp(\theta_i, r_r) \qquad (6)$$

Figure 8:
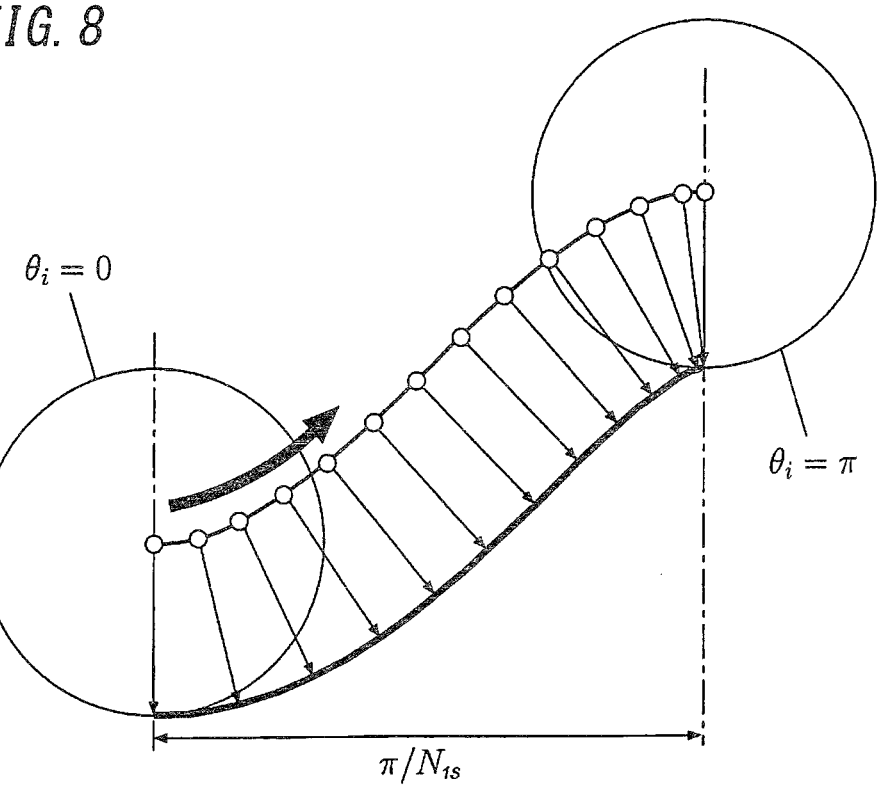
FIG. 8 is a drawing illustrating a tooth profile formed in the cases of $N_1=50$, $N_{1S}=49$, $\rho_r/\rho_g=0.02$, $\omega=0.020$ [rad], and $\alpha=0$ [rad]

FIG. 8 shows a relationship between the path of the first rotor tooth 10 at a position at $\theta_r=0$ and $r_r=\rho_g$ and the envelope used for forming the stator tooth row 8 when $\theta_i$ is changed from 0 to π based on the above. This is approximated and expanded on a plane instead of being drawn on the reference spherical surface 50. In addition, this is calculated in a condition of $N_1=50$, $N_{1S}=49$, $\rho_t/\rho_g=0.02$, ω=0.020 [rad], and α=0 [rad]. FIG. 8 shows that the first rotor tooth 10 continues to contact until moving to a top separated by $\pi/N_{1S}$ from a tooth bottom of the stator tooth row 8 when $\theta_i$ is changed from 0 to π. When $\theta_i$ is changed from π to 2π, the first rotor tooth 10 moves from the top to the tooth bottom of the stator tooth row 8 while continuing to contact with the stator tooth row 8 in a path symmetric to the path in FIG. 8. The other first rotor teeth 10 also perform the same operation although phases are different from each other. As a result, all teeth are contacted.

That is, in the above-mentioned condition, the first rotor tooth row 12 of the rotor 4 has a shape in which $N_1$ (=50) cone first rotor teeth 10 are circularly arranged. Then, the stator tooth row 8 of the stator 2 has a shape in which $N_{1S}$ (=49) stator teeth 6 are circularly arranged. While the rotor 4 performs the precession, all of the first rotor teeth 10 constantly make a line contact with the stator tooth row 8.

In the above-mentioned condition, the first rotor tooth 10 located at the point A where the rotor 4 is pressed to the stator 2 most deeply makes contact with the bottom of the corrugated stator tooth row 8. The first rotor tooth 10 located at the point B where the rotor 4 is raised so as to be farthest from the stator 2 makes contact with the top of the corrugated stator tooth row 8. The first rotor teeth 10 located at both of the points A and B are not contributed to driving. That is, $N_1/2-1$ (=24) first rotor teeth 10, which are located at each place (area) existing at both sides between which the devotion central line intervenes, are engaged with the stator tooth row 8 so as to transmit the rotation effectively.

Incidentally, although all first rotor teeth 10 make contact with the stator tooth row 8 in the above-mentioned condition, all first rotor teeth 10 does not necessarily make contact with the stator tooth row 8 in another condition. Generally, the number of contact teeth tends to decrease as $\rho_r/\rho_g$ is set so as to increases. The number of contact teeth tends to decrease as $\omega$ is set so as to increase. For example, when $N_1$, $N_{1S}$, $\rho_r/\rho_g$, $\omega$, and $\alpha$ are respectively set to 50, 49, 0.04, 0.020 [rad], and 0 [rad], twenty-four first rotor teeth 10 are located at each place existing at both sides between which the devotion central line intervenes, and fourteen first rotor teeth 10 of the twenty-four first rotor teeth 10 performs engagement effectively. When $N_1$, $N_{1S}$, $\rho_r/\rho_g$, $\omega$, and $\alpha$ are respectively set to 50, 49, 0.02, 0.033 [rad], and 0 [rad], nineteen first rotor teeth 10 of the twenty four first rotor teeth 10, which are located at each place existing at both sides between which the devotion central line intervenes, perform engagement efficiently.

As described above, in the crown gear deceleration mechanism according to the present embodiment, the stator 2 includes the stator tooth row 8 whose teeth number is $N_{1S}$, and the rotor 4 that is engaged with the stator 2 includes the first rotor tooth row 12 whose teeth number is $N_1$, and $N_1-N_{1S}$ is 1. Then, in each place existing at both sides between which the devotion central line of the rotor 4 intervenes, at least two of the teeth of the stator tooth row 8 are engaged with at least two of the teeth of the first rotor tooth row 12. Even in the case of $N_1-N_{1S}=-1$, the stator tooth row 8 can be generated as with the case of $N_1-N_{1S}=1$. In this case, the rotor 4 is rotated in an opposite direction for the case of $N_1-N_{1S}=1$.

Next, a method for generating the output tooth row 26 is described. Here, the output tooth row 26 is generated along a path of the second rotor tooth row 12 when the rotor 4 performs the precession. A cone shaped model as with that of the first rotor tooth 10 is used as a model of each second rotor tooth 14 constituting the second rotor tooth row 16. That is, a basic generation method of the output tooth row 26 is similar to that of the case of the stator tooth row 8 engaged with the first rotor tooth row 12. However, the difference in teeth number between the first rotor tooth row 12 and the stator tooth row 8 is one, whereas the difference in teeth number between the second rotor tooth row 12 and the output tooth row 26 is zero. Then, $N_2-N_{2S}$ becomes zero.

In this case, in the analysis model shown in FIGS. 4 and 5, calculation may be performed under a condition where the first rotor tooth row 12 is replaced with the second rotor tooth row 16, the stator 2 is replaced with the gear part 22 of the output shaft 18, and the difference in teeth number is zero. In the analysis model shown in FIGS. 4 and 5, because $\theta_i$ is zero and $\theta_o$ is zero, $\theta_o$ is constantly zero. Therefore, in the transformation matrix of the expression (3), $C_o$, $S_o$, $C_{io}$, and $S_{io}$ are respectively 1, 0, Ci, and Si. Accordingly, the position of $^S P_E$ when $\theta_r$ is 0 is expressed in the following expression (7).

[Expression 7]

$$^S P_E = \rho_g \begin{pmatrix} ((1 - C_\omega)S_i^2 + C_\omega)C_\alpha - S_\omega C_i S_\alpha \\ -(1 - C_\omega)S_i C_i C_\alpha - S_\omega S_i S_\alpha \\ -S_\omega C_i C_\alpha - C_\omega S_\alpha \end{pmatrix} \qquad (7)$$

Figure 9:
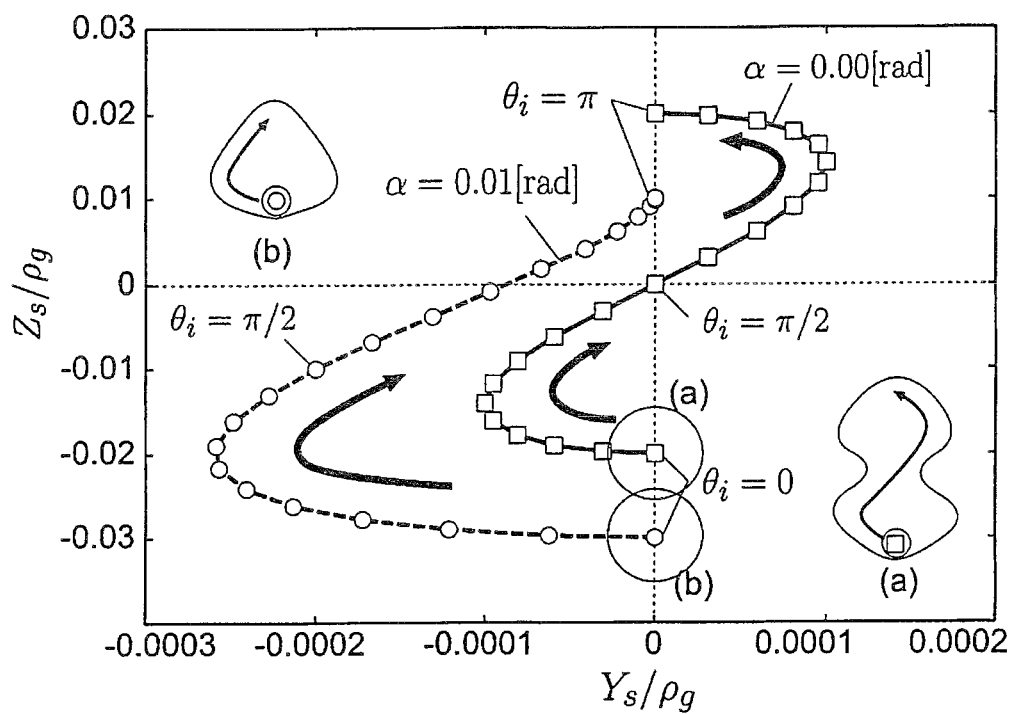
FIG. 9 is a drawing illustrating trajectories of rotor teeth in the case of $\alpha=0.00$ and $0.01$ [rad]

Here, FIG. 9 shows a path of $^S P_E$ when $\theta_i$ is changed from 0 to π in each of cases described below. One is the case where α is set to 0.00 [rad]. The other is the case where a is set to 0.01 [rad]. These paths are seen from an $X_S$ axis. ω is set to 0.02 [rad], and the paths are normalized by $\rho_g$. When $\theta_i$ is further changed from π to 2π, the path of $^S P_E$ becomes a path that is line symmetric for a line in that $Y_S/\rho_g$ is 0.

As a result, an outer shape of the output tooth row 26 generated becomes a shape, which is shown in left-up or right-down of FIG. 9, so as to cover the second rotor teeth 14. However, if each tooth is actually formed into this shape, it is hard to product each tooth and also perform attaching work.

Figure 10:
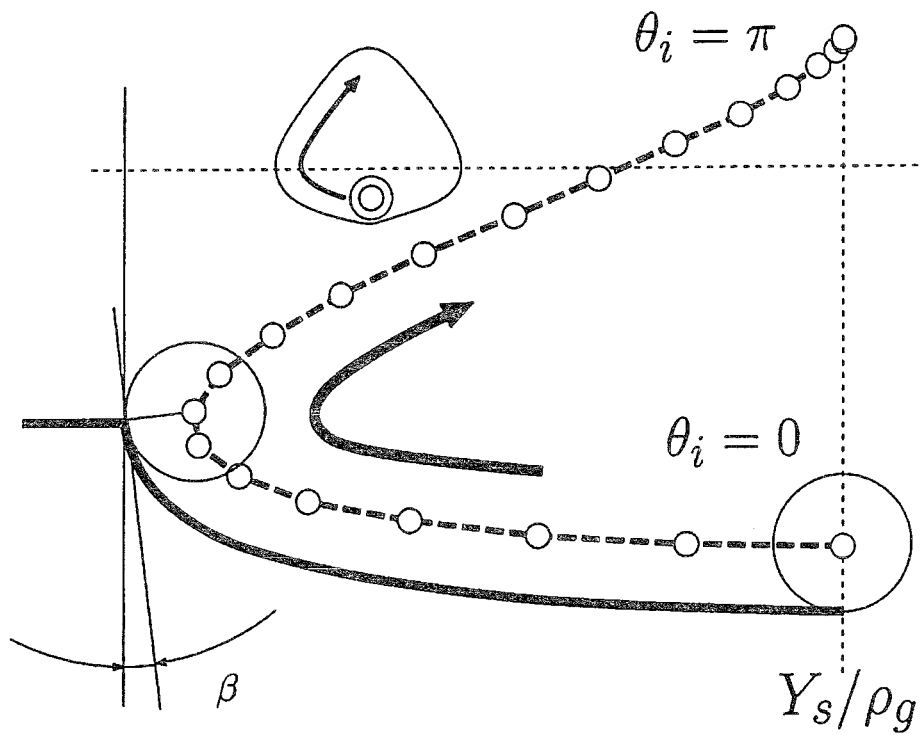
FIG. 10 is a drawing illustrating a tooth profile formed in the case of $\alpha=0.01$ [rad]

In FIG. 10, in view of the above situation, in the case of α=0.01 [rad], the output tooth row 26 is formed with a path of $^S P_E$ when $\theta_i$ is changed from 0 to a value before $Y_S$ component is changed so as to increase. In this case, no constriction occurs to the output teeth 24, and then it is easy to process teeth. In this case, a pressure angle β becomes also very small.

Figure 11:
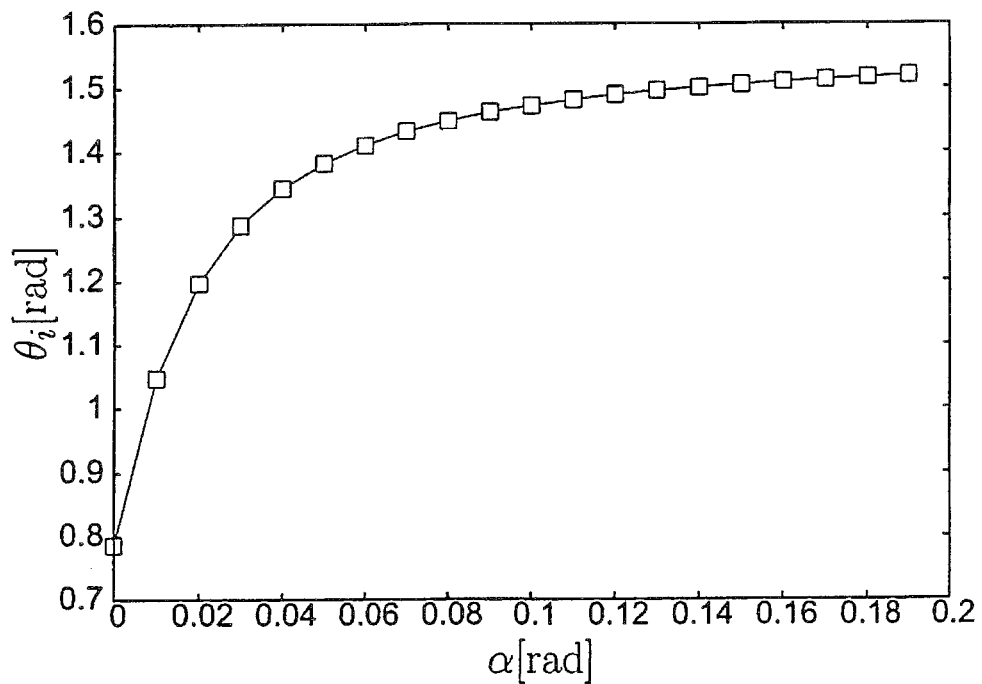
FIG. 11 is a drawing illustrating a relationship between $\alpha$ and $\theta_i$.

$Y_S$ component includes $\theta_i$, ω, and α, and a designer sets a of these. FIG. 11 shows $\theta_i$, at which $Y_S$ is changed to increase, to α in the case of ω=0.02 [rad]. In FIG. 11, $\theta_i$ shows an angle of the press rotor 32 when the tooth in the case of $\theta_o$=0 is separated from the output shaft 18. That is, the teeth when $\theta_r$ is $-\theta_i$ to $\theta_i$ are engaged while centering the case of $\theta_r$=0.

Figure 12:
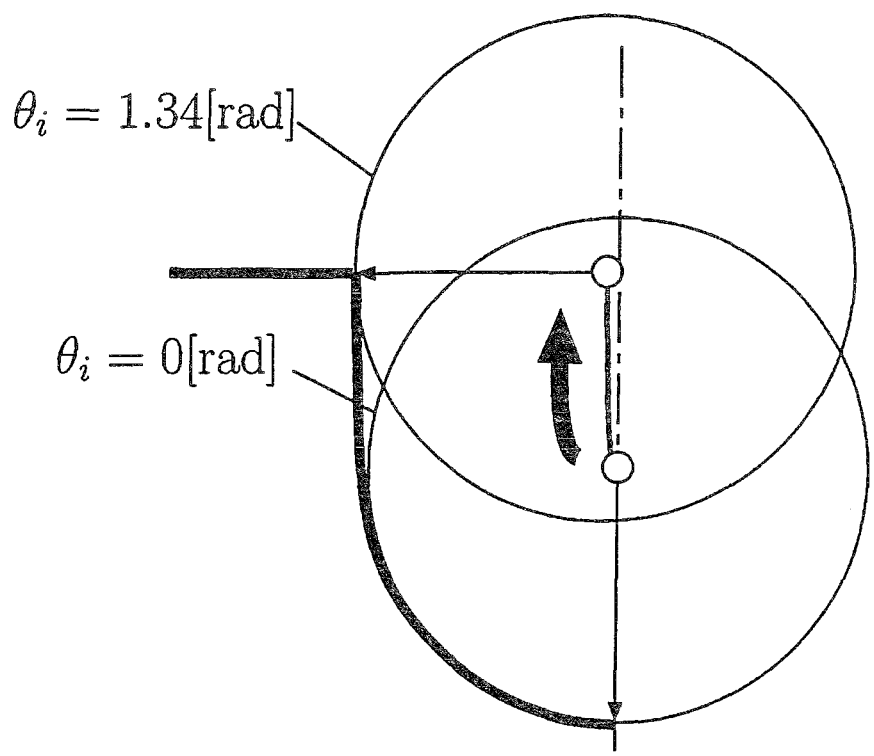
FIG. 12 is a drawing illustrating a tooth profile formed in the case of $\alpha=0.04$ [rad]

According to FIG. 11, in the case where a is equal to or more than 0.04 [rad], a large change is not existed. On the other hand, the second rotor teeth 14 are thicker as a is larger. Therefore, it is the causing of increasing in size of a whole mechanism and vibration generating. In view of these situations, FIG. 12 shows, with a thick line, a tooth profile of the output tooth row 26 generated when a is set to 0.04 [rad]. The rotor 4 is rotated in one direction according to the precession. The rotor 4 transmits the rotation while the second rotor teeth 14 make contact with the output tooth row 26 in the rotation direction. In particularly, in this set case, in each place existing at both sides between which the devotion central line of the rotor 4 intervenes, at least two of the second rotor teeth 14 transmit the rotation while being engaged with the output tooth row 26.

As described above, teeth between the rotor 4 and the stator 2 can be generated, using the same method as teeth between the rotor 4 and the output shaft 18. For this reason, even if the difference in teeth number $N_1-N_{15}$ is selected and set to any of +1, 0, and -1, the rotor 4 and the stator 2 can perform the precession while one or plural teeth of the rotor 4 are engaged with one or plural teeth of the stator 2 at each place existing at both sides between which the devotion central line intervenes. Similarly, even if the difference in teeth number $N_1-N_{1S}$ is selected and set to any of +1, 0, and -1, the rotor 4 and the output shaft 18 can transmit the rotation around the central axis 60 from the rotor 4 to the output shaft 18 while one or plural teeth of the rotor 4 are engaged with one or plural teeth of the output shaft 18 at each place existing at both sides between which the devotion central line intervenes.

The number of the combination of the difference in teeth number $N_1-N_{1S}$ and the difference in teeth number $N_2-N_{2S}$ is simply considered to nine (three is multiplied by three) as shown in table 1 described below. However, in the case of No. 5 in table 1, because the reduction ratio is 0 and the output shaft 18 is not rotated, the combination is not functioned as the deceleration mechanism. That is, the combination of ($N_1-N_{1S}$, $N_2-N_{2S}$) for being functioned as the deceleration mechanism is selected of (1, 1), (1, 0), (1, −1), (0, 1), (0, −1), (−1, 1), (−1, 0), and (−1, −1). In the above-mentioned embodiment, the combination of ($N_1-N_{1S}$, $N_2-N_{2S}$) is (1, 0).

Incidentally, in a conventional crown gear deceleration mechanism described in a background art, when this is assembled, four elements of a rotor, an elastic member (an elastic disk or the like), a stator, and an output shaft are arranged on the same axis with a jig, and then these elements need to be coupled with each other. For this reason, there is a problem in that it is hard to easily perform assembly work. On the other hand, in the crown gear deceleration mechanism according to the present embodiment described above, because centers of the rotor 4, the stator 2, and the output shaft 18 are fixed by engagement between gears without a specific jig, it is possible to easily perform assembly work. In addition, the rotor 4 is maintained in a state where the centers are fixed by the engagement between the gears, in the state where the rotor 4 is held between the press rotor 32, which is located on an input side of the rotor 4, and the stator 2 and the output shaft 18, which are located on an output side of the rotor 4. Therefore, a support mechanism supporting the rotor 4 is unnecessary, and then it is possible to make the rotor 4 perform the precession without the specific support mechanism. In the description, the rotor 4 functioning as the above is referred to as a "floating rotor".

A constant condition needs to be met for the rotor 4 functioning as the floating rotor. Hereinafter, this condition will be further described.

In the above-mentioned crown gear deceleration mechanism according to the present embodiment, a movable direction of the rotor 4 to the stator 2 (hereinafter, referred to as a "first movable direction") is set to be different from a movable direction of the rotor 4 to the output shaft 18 (hereinafter, referred to as a "second movable direction"). Therefore, the crown gear deceleration mechanism holds a center of the rotor 4 and makes the rotor 4 function as the floating rotor.

Figure 14:
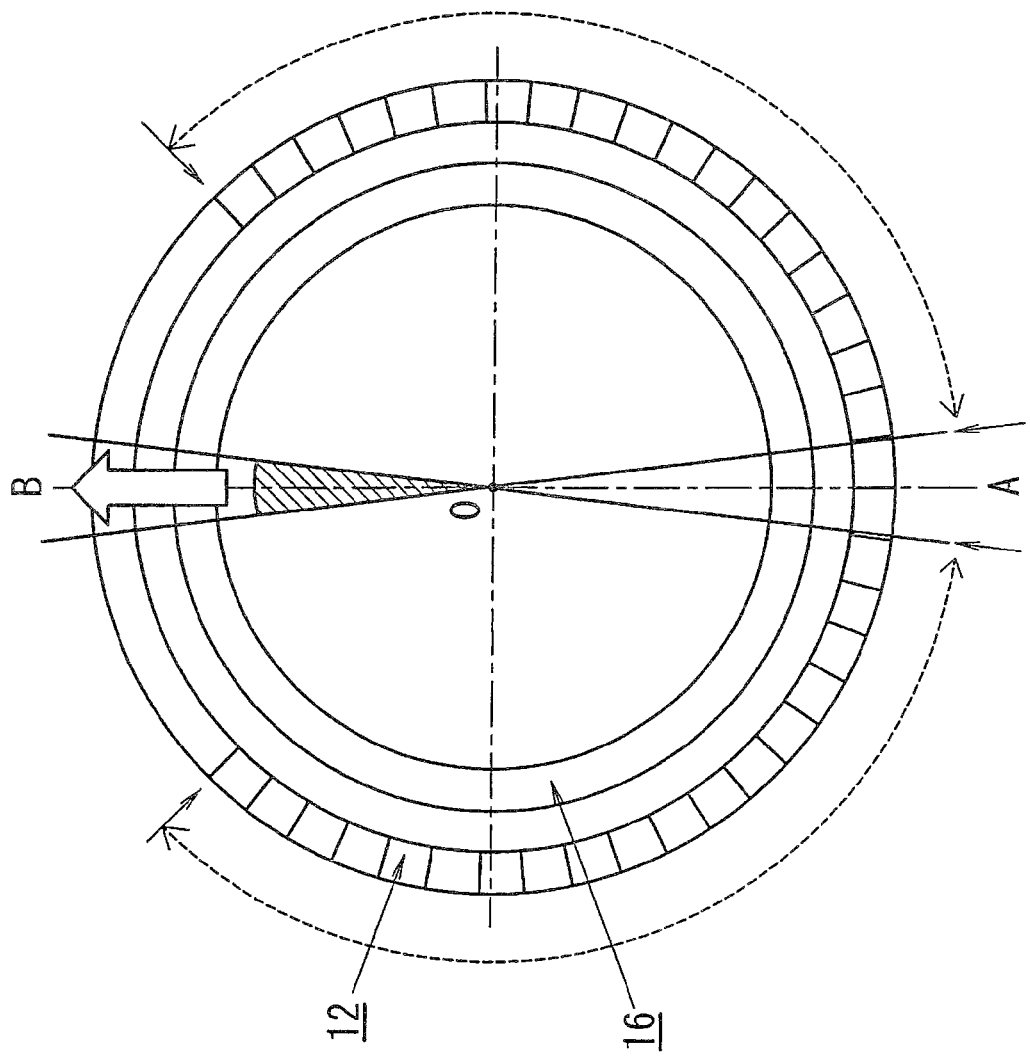
FIG. 14 is a drawing of the rotor as seen from another direction.
Figure 13:
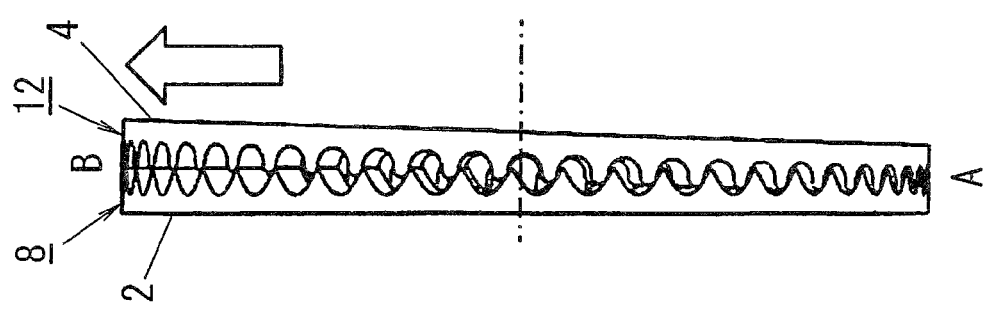
FIG. 13 is a drawing for explaining a movable direction of the rotor to the stator.

FIGS. 13 and 14 show the first movable direction of the rotor 4. As shown in a white arrow in drawings, the first movable direction of the rotor 4 is generally a direction from a center O to a point B along the devotion central line (hereinafter, referred to as a "B direction") and has a slight width in a circumferential direction. More specifically, the first movable direction of the rotor 4 is an area represented with diagonal lines in drawing. The area is generated so as to expand in a fan shape in which a center line is a half line toward the point B from the center O of the rotor 4 as a starting point. Areas represented with dashed arrows in drawing are areas in which the first rotor tooth row 12 makes line contacts with the stator tooth row 8. The line contacts are performed at several places in these areas.

Figure 16:
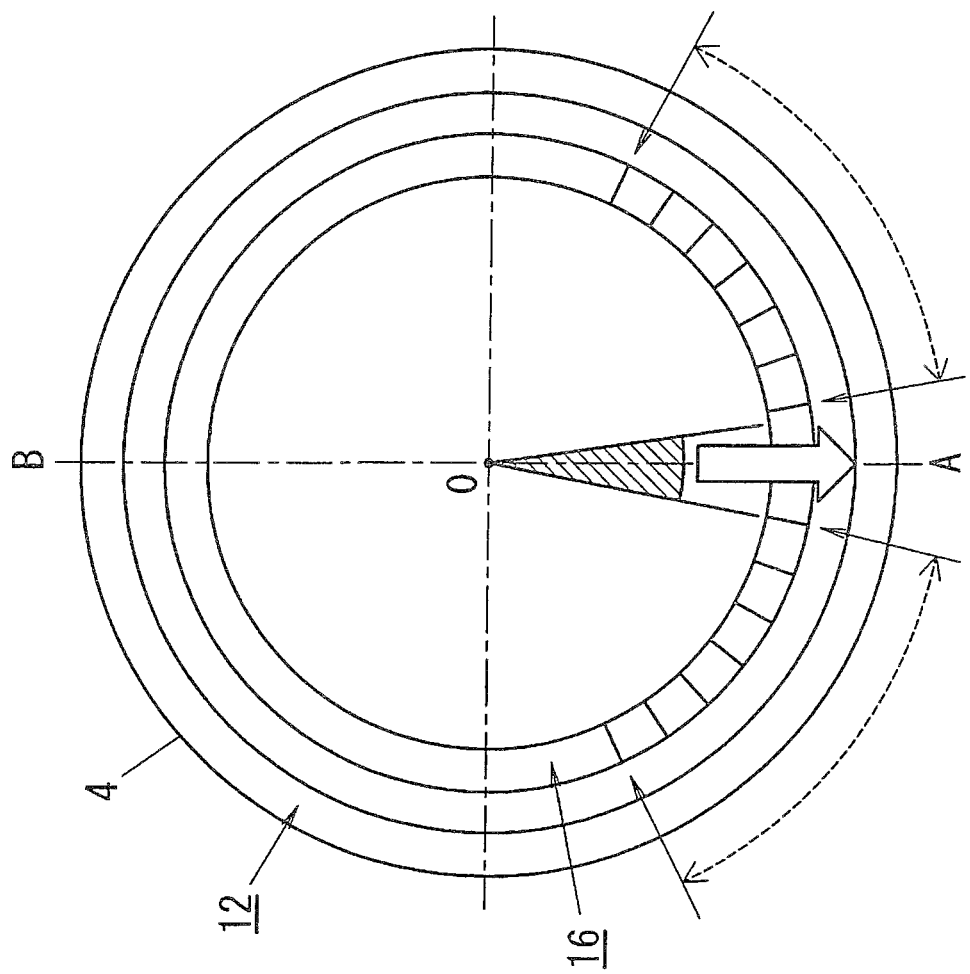
FIG. 16 is a drawing of the rotor as seen from another direction.
Figure 15:
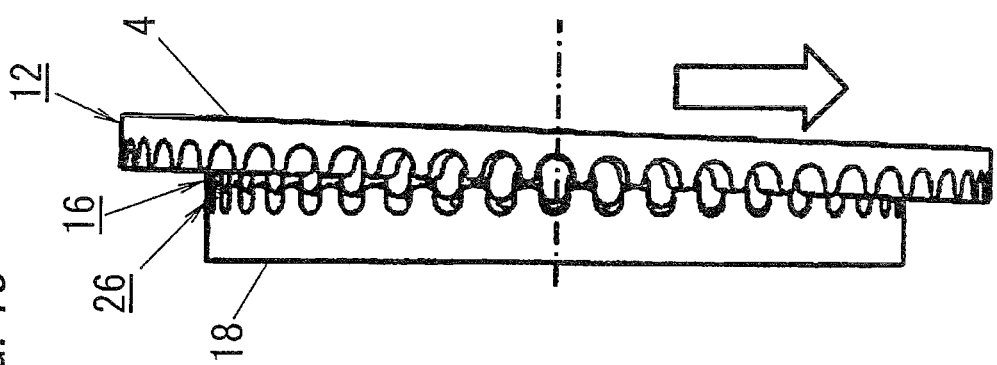
FIG. 15 is a drawing for explaining a movable direction of the rotor to the output shaft.

FIGS. 15 and 16 show the second movable direction of the rotor 4. As shown in a white arrow in drawings, the second movable direction of the rotor 4 is generally a direction from a center O to a point A along the devotion central line (hereinafter, referred to as a "A direction") and has a slight width in a circumferential direction. More specifically, the second movable direction of the rotor 4 is an area represented with diagonal lines in drawing. The area is generated so as to expand in a fan shape in which a center line is a half line toward the point A from the center O of the rotor 4 as a starting point. Areas represented with dashed arrows in drawing are areas in which the second rotor tooth row 16 makes lines contacts with the output tooth row 26. The line contacts are performed at several places in these areas.

As shown in FIGS. 14 and 16, in the rotor 4, the first movable direction is not overlapped with the second movable direction as seen from an axis direction of a central axis 60. Therefore, the rotor 4, which is simultaneously engaged with the stator 2 and the output shaft 18, preforms the precession in a state where the center O thereof is held.

Incidentally, the present inventors found out the following when the rotor 4 is engaged with the other crown gear (for example, the stator 2 or the output shaft 18) at the places existing at both sides between which the devotion central line intervenes: when the teeth number of the rotor 4 is one more than that of the other crown gear, the movable direction of the rotor 4 is the B direction; and when the teeth number of the rotor 4 is equal to or one less than that of the other crown gear, the movable direction of the rotor 4 is the A direction.

That is, the first movable direction of the rotor 4 is the B direction when the teeth numbers meet a condition of $N_1-N_{1S}=1$, and is the A direction when the teeth numbers meet a condition of $N_1-N_{1S}=0$ or −1. The second movable direction of the rotor 4 is the B direction when the teeth numbers meet a condition of $N_2-N_{2S}=1$, and is the A direction when the teeth numbers meet a condition of $N_2-N_{2S}=0$ or −1. Although both of the first movable direction and the second movable direction have the widths in the circumferential direction, the A direction is not overlapped with the B direction.

Figure 17:
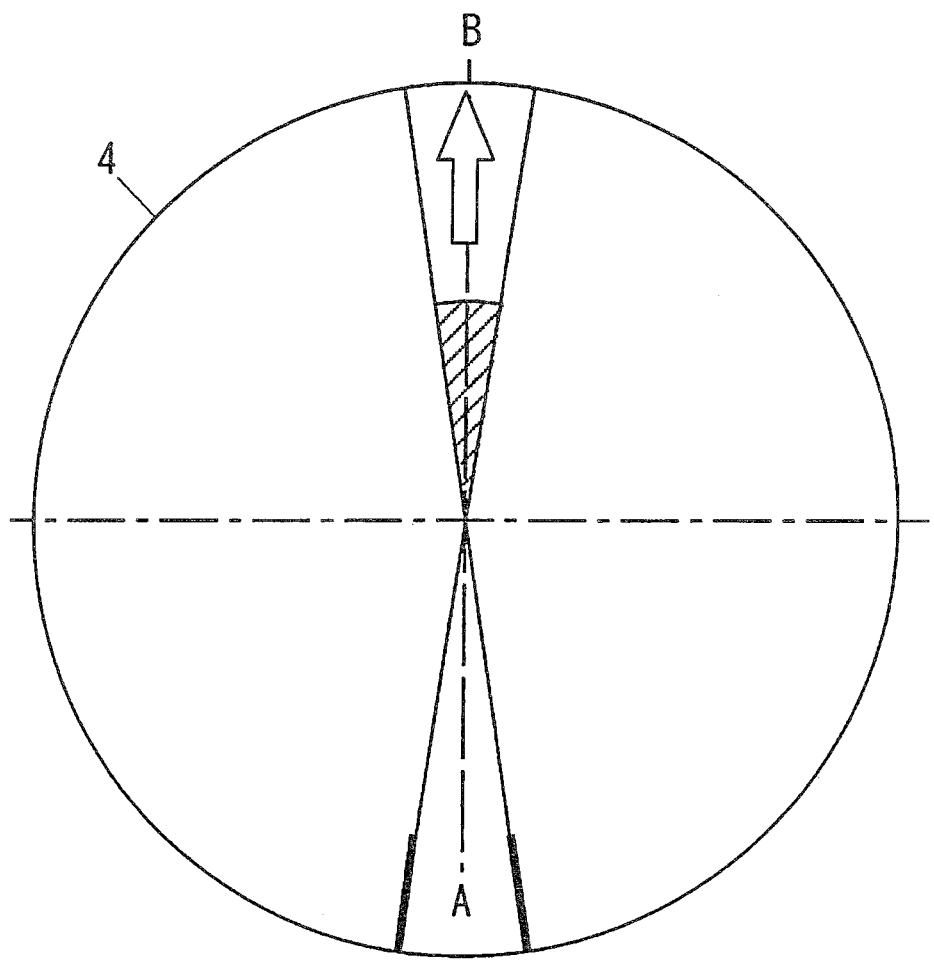
FIG. 17 is a drawing for explaining a movable direction in the case of $N_1-N_{1S}=1$.
Figure 18:
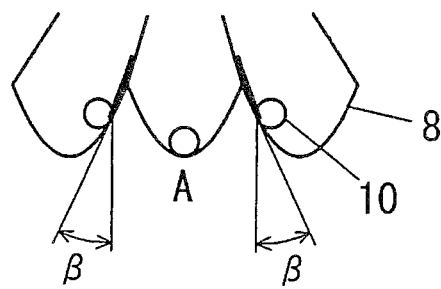
FIG. 18 is a drawing of a main part as seen from another direction.

FIGS. 17 to 22 show a schematic model for describing the reason why the movable direction is decided by the difference in teeth number as described above. FIGS. 17 and 18 show a model when the teeth numbers meet the condition of $N_1-N_{1S}=1$. The first rotor teeth 10 of the rotor 4 make line contacts with the stator tooth row 8 of the stator 2 at parts shown with thick lines in drawings. In this case, because the first rotor teeth 10 make the line contacts with the stator tooth row 8 as shown in the drawings, the movable direction of the rotor 4 in an engagement state becomes the B direction.

Figure 19:
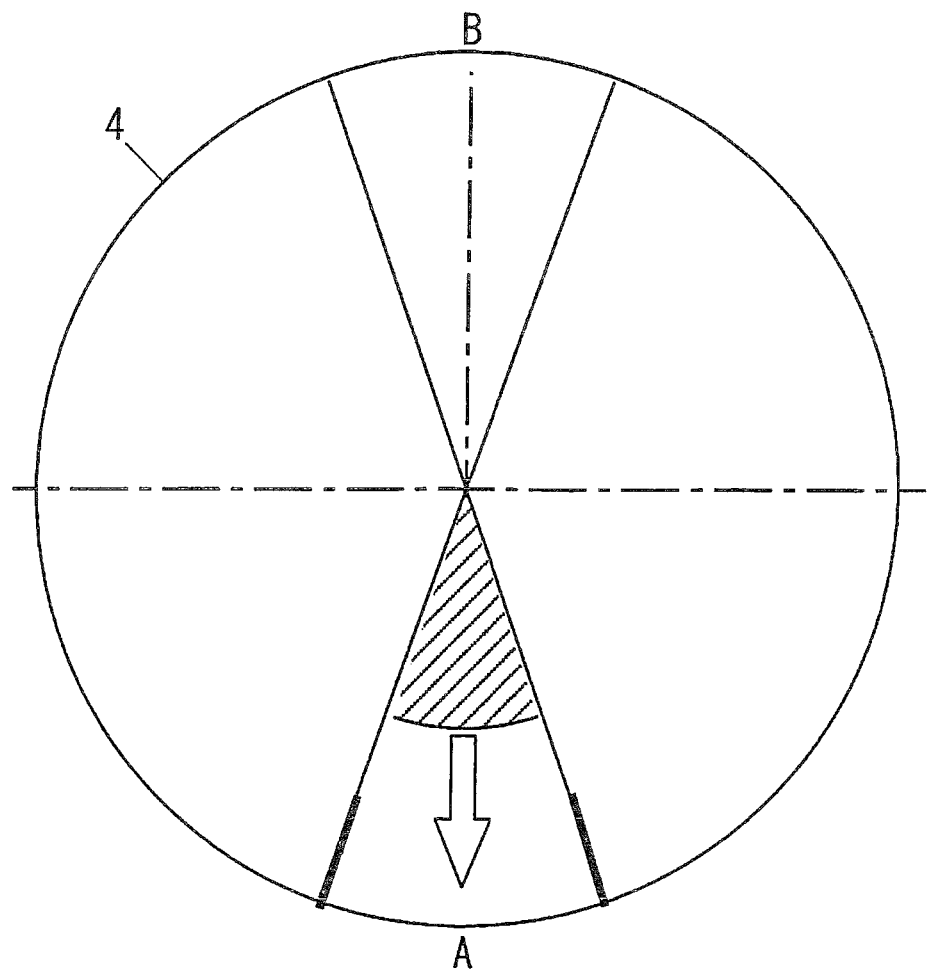
FIG. 19 is a drawing for explaining a movable direction in the case of $N_1-N_{1S}=-1$.
Figure 20:
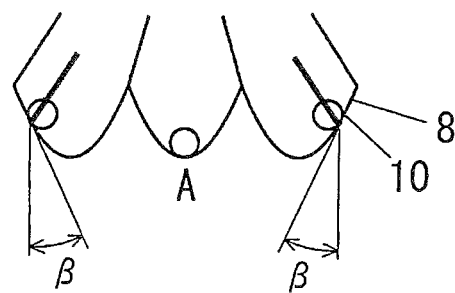
FIG. 20 is a drawing of a main part as seen from another direction.
Figure 21:
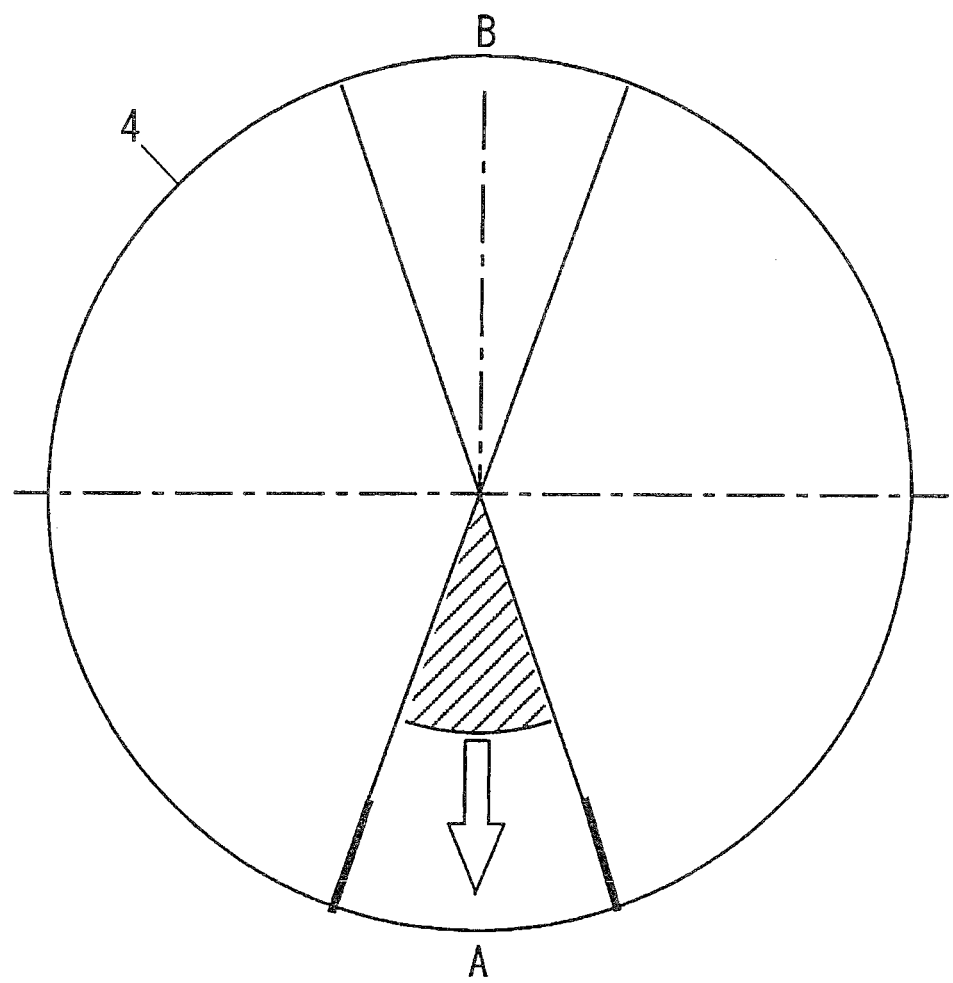
FIG. 21 is a drawing for explaining a movable direction in the case of $N_1-N_{1S}=0$.
Figure 22:
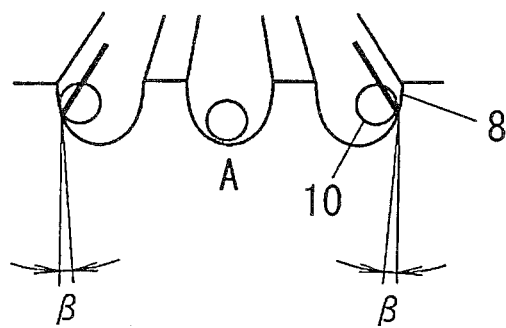
FIG. 22 is a drawing of a main part as seen from another direction.

FIGS. 19 and 20 show a model when the teeth numbers meet the condition of $N_1-N_{1S}=-1$. In this case, because the first rotor teeth 10 make line contacts with the stator tooth row 8 as shown with thick lines in the drawings, the movable direction of the rotor 4 in an engagement state becomes the A direction. FIGS. 21 and 22 show a model when the teeth numbers meet the condition of $N_1-N_{1S}=0$. In this case, the first rotor teeth 10 make contact with the stator tooth row 8 substantially same as the condition of $N_1-N_{1S}=-1$ as shown in drawings. The movable direction of the rotor 4 in an engagement state becomes the A direction same as the condition of $N_1-N_{1S}=-1$.

Figure 23:
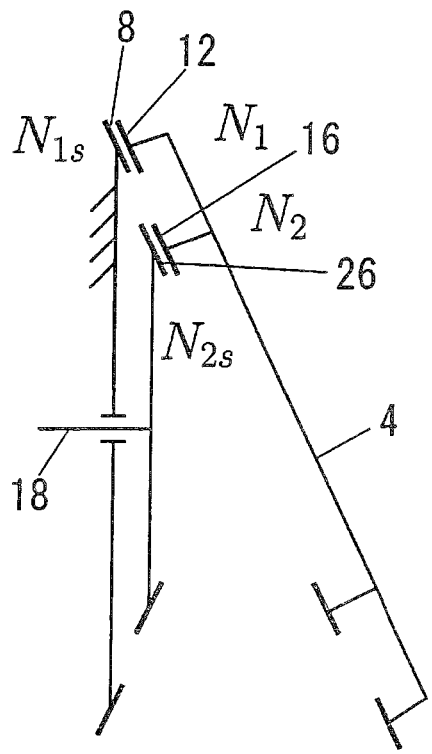
FIG. 23 is a drawing illustrating a front wall type crown gear deceleration mechanism.

Then, as shown in FIG. 23, the present inventors found out the following: in a mechanism in which the stator tooth row 8 of the stator 2 is located on an output side to the rotor 4, when the first movable direction of the rotor 4 is different from the second movable direction of the rotor 4, the center of the rotor 4 is held. The crown gear deceleration mechanism according to the present embodiment is a mechanism that has a type shown in FIG. 23. This mechanism is referred to as a "front wall type" in the description.

Figure 24:
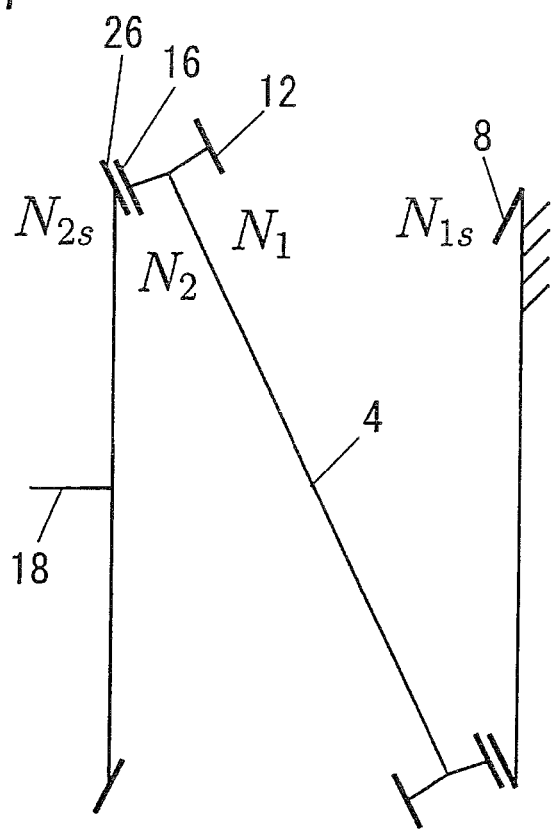
FIG. 24 is a drawing illustrating a back wall type crown gear deceleration mechanism.
Figure 25:
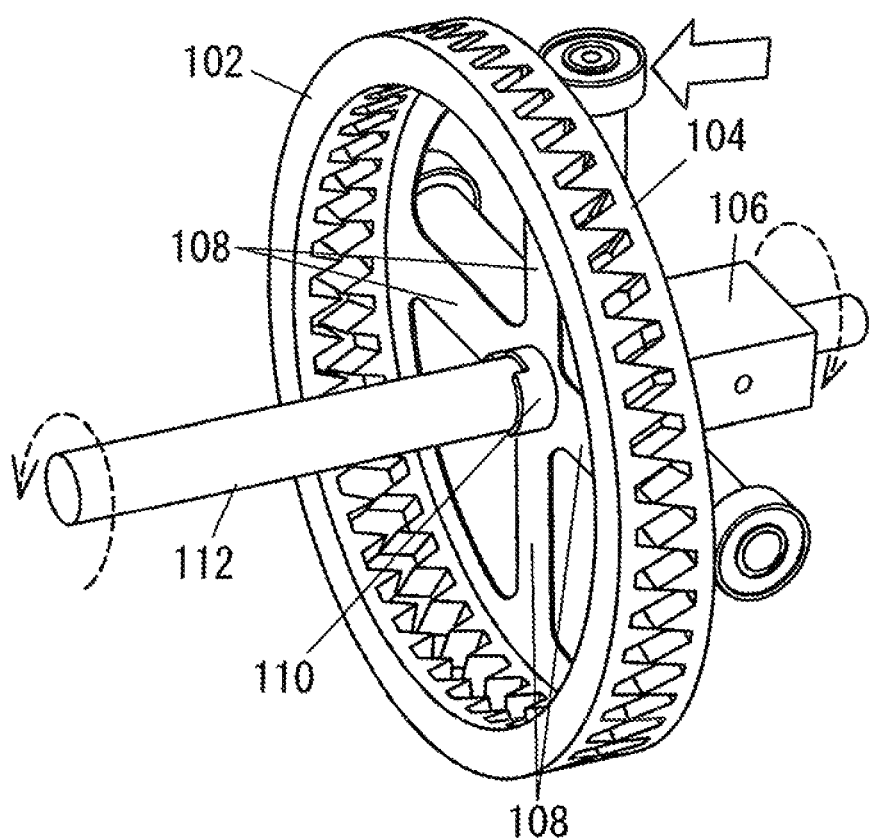
FIG. 25 is a perspective view of a conventional crown gear deceleration mechanism.

FIG. 24 shows a mechanism that has a type in which the stator tooth row 8 of the stator 2 is located on an input side to the rotor 4. In this mechanism, when the first movable direction of the rotor 4 matches to the second movable direction of the rotor 4, the center of the rotor 4 is held. This mechanism is referred to as a "back wall type" in the description.

Table 1 described below shows a summary the above description. A symbol "O" in the table shows that the center of the rotor 4 is held and the rotor 4 is capable of functioning as the floating rotor. A symbol "X" in the table shows that the center of the rotor 4 is not held and the rotor 4 does not function as the floating rotor.

TABLE 1

| No. | $N_1-N_{1S}$ | $N_2-N_{2S}$ | FRONT WALL TYPE | BACK WALL TYPE |
|---|---|---|---|---|
| 1 | 1 | 1 | X | O |
| 2 | 1 | 0 | O | X |
| 3 | 1 | -1 | O | X |
| 4 | 0 | 1 | O | X |
| 5 | 0 | 0 | X | O |
| 6 | 0 | -1 | X | O |
| 7 | -1 | 1 | O | X |
| 8 | -1 | 0 | X | O |
| 9 | -1 | -1 | X | O |

Incidentally, to make the rotor 4 function as the floating rotor, it is preferable to be a mechanism that easily achieves high precision. In that sense, the front wall type shown in FIG. 23, in which the first rotor teeth 10 and the second rotor teeth 14 project in the same direction, is considered to realize processing and attachment with high precision more easily and be more suitable to realization of the floating rotor than the back wall type shown in FIG. 24, in which the first rotor teeth 10 and the second rotor teeth 14 project in the opposite direction. Further, if the back wall type is used, it is possible to form each component by one-side processing.

In addition, in a phase of transmission efficiency of power, preferably, $N_1-N_{1S}$ or $N_2-N_{2S}$ is zero because a pressure angle $\beta$ can be set in the case of $N_1-N_{1S}=0$ much smaller than the case of $N_1-N_{1S}=+1$ or $-1$ as shown schematically in FIGS. 18, 20, and 22. Specifically, the pressure angle $\beta$ is about 20 to 40 degree in the case of $N_1-N_{1S}=+1$ or $-1$. On the other hand, the pressure angle $\beta$ is substantially 0 in the case of $N_1-N_{1S}=0$, and then the transmission efficiency of power is advantageous.

In the present embodiment, at least two of the stator teeth 6 are engaged with at least two of the first rotor teeth 10 at each of the places existing at both sides between which the devotion central line of the rotor 4 intervenes. However, even though one stator tooth 6 is engaged with one first rotor tooth 10 at each of the places existing at both sides between which the devotion central line intervenes, the above-mentioned mechanism according to the present embodiment can be realized. Similarly, in the present embodiment, at least two of the output teeth 24 are engaged with at least two of the second rotor teeth 14 at each of the places existing at both sides between which the devotion central line of the rotor 4 intervenes. However, even though one output tooth 24 is engaged with one second rotor tooth 14 at each of the places existing at both sides between which the devotion central line intervenes, the above-mentioned mechanism according to the present embodiment can be realized. Needless to say, when at least two of the teeth of one element are constantly engaged with at least two of the teeth of the other element at each of two places existing at both sides, higher strength, rigidity, and durability can be obtained as a whole mechanism. In addition, the center of the rotor 4 can be more certainly held by the engagement between the gears.

As described above in detail based on the accompanying drawings, the crown gear deceleration mechanism according to the present embodiment includes the stator 2, the rotor 4, and the output shaft 18. The stator 2 includes the crown gear. The rotor 4 includes another crown gear that is located so as to be inclined to the crown gear. The output shaft 18 is coupled to the rotor 4. The stator 2 includes the stator tooth row 8 in which the $N_{1S}$ stator teeth 6 are circularly arranged. The rotor 4 includes: the first rotor tooth row 12 in which the $N_1$ first rotor teeth 10 are circularly arranged; and the second rotor tooth row 16 in which the $N_2$ second rotor teeth 14 are circularly arranged. The output shaft 18 includes the output tooth row 26 in which the $N_{2S}$ output teeth 24 are circularly arranged. The rotor 4 is configured to perform the precession while engaging the first rotor tooth row 12 with the stator tooth row 8 at the places existing at both sides between which the devotion central line of the rotor 4 intervenes. The rotor 4 is configured to transmit the rotation to the output shaft 18 while engaging the second rotor tooth row 16 with the output tooth row 26 at the places similarly existing at both sides between which the devotion central line of the rotor 4 intervenes.

According to the crown gear deceleration mechanism of the present embodiment, it is possible to transmit the rotation to the output shaft 18 by the engagement between the gears without an elastic member intervening between the rotor 4 and the output shaft 18 unlike a conventional crown gear mechanism described in a background art. Therefore, it is possible to more enhance strength, rigidity, and durability of the whole crown gear deceleration mechanism.

The combination of the difference in teeth number between the crown gears of the crown gear deceleration mechanism according to the present embodiment, that is, the combination of $(N_1-N_{1S}, N_2-N_{2S})$ is any one of $(1, 1)$, $(1, 0)$, $(1, -1)$, $(0, 1)$, $(0, -1)$, $(-1, 1)$, $(-1, 0)$, and $(-1, -1)$.

In particularly, if the combination of $(N_1-N_{1S}, N_2-N_{2S})$ is any one of $(1, 0)$, $(0, 1)$, $(0, -1)$, and $(-1, 0)$, the engagement between the rotor 4 and the stator 2 is performed in the condition where the difference in teeth number therebetween is zero, or the engagement between the rotor 4 and the output shaft 18 is performed in the condition where the difference in teeth number therebetween is zero. When the difference in teeth number is zero, the pressure angle $\beta$ can be set to near zero. Therefore, it is possible to transmit power at high efficiency.

In the crown gear deceleration mechanism according to the present embodiment, preferably, the first rotor teeth 10 and the second rotor teeth 14 project from the rotor 4 in the same direction in that processing and attachment with high precision can be performed, and each component can be formed by one-side processing.

In this case, preferably, the combination of $(N_1-N_{1S}, N_2-N_{2S})$ is any one of $(1, 0)$, $(1, -1)$, $(0, 1)$, and $(-1, 1)$. Therefore, it is possible to make the rotor 4 function as the floating rotor. If the rotor 4 is made to function as the floating rotor, there are the following advantages: attachment work can be simplified; and a mechanism can be made to compact because a support mechanism for supporting the rotor 4 is unnecessary; and productivity is improved.

Further, in this case, preferably, the combination of $(N_1-N_{1S}, N_2-N_{2S})$ is $(1, 0)$ or $(0, 1)$. In this case, the engagement between the rotor 4 and the stator 2 is performed in the condition where the difference in teeth number therebetween is zero, or the engagement between the rotor 4 and the output shaft 18 is performed in the condition where the difference in teeth number therebetween is zero. Therefore, it is possible to transmit power at high efficiency.

In the crown gear deceleration mechanism according to the present embodiment, preferably, the first rotor teeth 10 and the second rotor teeth 14 project from the rotor 4 in the mutually opposite direction.

In this case, preferably, the combination of ($N_1-N_{1S}$, $N_2-N_{2S}$) is any one of (1, 1), (0, −1), (−1, 0), and (−1, −1). In this case, it is possible to make the rotor 4 function as the floating rotor. If the rotor 4 is made to function as the floating rotor, there are the following advantages: attachment work can be simplified; and a mechanism can be made to compact because a support mechanism for supporting the rotor 4 is unnecessary; and productivity is improved.

Further, in this case, preferably, the combination of ($N_1-N_{1S}$, $N_2-N_{2S}$) is (0, −1), or (−1, 0). In this case, the engagement between the rotor 4 and the stator 2 is performed in the condition where the difference in teeth number therebetween is zero, or the engagement between the rotor 4 and the output shaft 18 is performed in the condition where the difference in teeth number therebetween is zero. Therefore, it is possible to transmit power at high efficiency.

In the crown gear deceleration mechanism according to the present embodiment, the rotor 4 is configured to perform the precession while engaging the at least two of the first rotor teeth 10 with the stator tooth row 8 at each of the places existing at both sides between which the devotion central line of the rotor 4 intervenes. Therefore, higher strength, rigidity, and durability can be obtained as a whole mechanism. In addition, it is also possible to more certainly perform that the center of the rotor 4 is held by the engagement between the gears.

In the crown gear deceleration mechanism according to the present embodiment, the rotor 4 is configured to transmit the rotation to the output shaft 18 while engaging the at least two of the second rotor teeth 14 with the output tooth row 26 at each of the places existing at both sides between which the devotion central line intervenes. Therefore, higher strength, rigidity, and durability can be obtained as a whole mechanism. In addition, it is also possible to more certainly perform that the center of the rotor 4 is held by the engagement between the gears.

In the crown gear deceleration mechanism according to the present embodiment, the stator tooth row 8 is formed to be engaged with the first rotor tooth row 12 so that the difference in teeth number between the stator tooth row 8 and the first rotor tooth row 12 is zero, or the output tooth row 26 is formed to be engaged with the second rotor tooth row 16 so that the difference in teeth number between the output tooth row 26 and the second rotor tooth row 16 is zero. Therefore, as described above, the pressure angle β can be set to near zero, and then, it is possible to transmit power at high efficiency.

Although the present invention has been described based on the embodiment shown in the accompanying drawings, the present invention is not limited to the above embodiment, and may be made appropriate design changes within a range that is intended by the present invention.

The invention claimed is:

1. A crown gear deceleration mechanism comprising:
a stator comprising a crown gear;
a rotor comprising another crown gear that is located so as to be inclined to the crown gear; and
an output shaft coupled to the rotor;
wherein the stator comprises a stator tooth row in which $N_{1s}$ stator teeth are circularly arranged,
wherein the rotor comprises:
a first rotor tooth row in which $N_1$ first rotor teeth are circularly arranged; and
a second rotor tooth row in which $N_2$ second rotor teeth are circularly arranged,
wherein the output shaft comprises an output tooth row in which $N_{2s}$ output teeth are circularly arranged, and
wherein the rotor is configured to perform a precession while engaging the first rotor tooth row with the stator tooth row at places existing at both sides between which a devotion central line of the rotor intervenes,
the rotor being configured to transmit rotation to the output shaft while engaging, the second rotor tooth row with the output tooth row at the places existing at both sides between which the devotion central line intervenes,
wherein the devotion central line is a line segment extending from a point at which the rotor is pressed to the stator most deeply to a point at which the rotor rises so as to be furthest from the stator,
wherein the first rotor teeth and the second rotor teeth project from the rotor in a same direction,
wherein a combination of ($N_1-N_{1s}$, $N_2-N_{2s}$) is any one of (1, 0), (1,−1), (0, 1), and (−1, 1), and
wherein a center of the rotor is held by engagement of the first rotor tooth row with the stator tooth row and engagement of the second rotor tooth row with the output tooth row.

2. The crown gear deceleration mechanism according to claim 1, wherein the combination of ($N_1-N_{1s}$, $N_2-N_{2s}$) is (1, 0) or (0, 1).

3. The crown gear deceleration mechanism according to claim 1, wherein the rotor is configured to perform the precession while engaging at least two of the first rotor teeth with the stator tooth row at each of the places existing at both sides between which the devotion central line of the rotor intervenes.

4. The crown gear deceleration mechanism according to claim 1, wherein the rotor is configured to transmit the rotation to the output shaft while engaging at least two of the second rotor teeth with the output tooth row at each of the places existing at both sides between which the devotion central line intervenes.

5. The crown gear deceleration mechanism according to claim 1,
wherein the rotor is configured to perform the precession while engaging at least two of the first rotor teeth with the stator tooth row at each of the places existing at both sides between which the devotion central line of the rotor intervenes,
the rotor being configured to transmit the rotation to the output shaft while engaging the at least two of the second rotor teeth with the output tooth row at each of the places existing at both sides between which the devotion central line intervenes.

6. The crown gear deceleration mechanism according to claim 1, wherein the stator tooth row is formed to be engaged with the first rotor tooth row so that a difference in teeth number between the stator tooth row and the first rotor tooth row is zero, or the output tooth row is formed to be engaged with the second rotor tooth row so that a difference in teeth number between the output tooth row and the second rotor tooth row is zero.

7. A crown gear deceleration mechanism comprising:
a stator comprising a crown gear;
a rotor comprising another crown gear that is located so as to be inclined to the crown gear; and
an output shaft coupled to the rotor,
wherein the stator comprises a stator tooth row in which $N_{1s}$ stator teeth are circularly arranged, wherein the rotor comprises:
a first rotor tooth row in which $N_1$ first rotor teeth are circularly arranged; and
a second rotor tooth row in which $N_2$ second rotor teeth are circularly arranged,
wherein the output shaft comprises an output tooth row in which $N_{2s}$ output teeth are circularly arranged, and
wherein the rotor is configured to perform a precession while engaging the first rotor tooth row with the stator tooth row at places existing at both sides between which a devotion central line of the rotor intervenes,
the rotor being configured to transmit rotation to the output shaft while engaging the second rotor tooth row with the output tooth row at the places existing at both sides between which the devotion central line intervenes,
wherein the devotion central line is a line sea lent extending from a point at which the rotor is pressed to the stator most deeply to a point at which the rotor rises so as to be farthest from the stator,
wherein the first rotor teeth project from the rotor in a direction opposite to a direction in which the second rotor teeth project from the rotor,
wherein a combination of $(N_1-N_{1s}, N_2-N_{2s})$ is any one of $(1, 1)$, $(0, -1)$, $(-1, 0)$, and $(-1, -1)$, and
wherein a center of the rotor is held by engagement of the first rotor tooth row with the stator tooth row and engagement of the second rotor tooth row with the output tooth row.

8. The crown gear deceleration mechanism according to claim 7, wherein the combination of $(N_1-N_{1s}, N_2-N_{2s})$ is $(0, -1)$ or $(-1, 0)$.

9. The crown gear deceleration mechanism according to claim 7, wherein the rotor is configured to perform the precession while engaging at least two of the first rotor teeth with the stator tooth row at each of the places existing at both sides between which the devotion central line of the rotor intervenes.

10. The crown gear deceleration mechanism according to claim 7, wherein the rotor is configured to transmit the rotation to the output shaft while engaging at least two of the second rotor teeth with the output tooth row at each of the places existing at both sides between which the devotion central line intervenes.

11. The crown gear deceleration mechanism according to claim 7,
wherein the rotor is configured to perform the precession while engaging at least two of the first rotor teeth with the stator tooth row at each of the places existing at both sides between which the devotion central line of the rotor intervenes,
the rotor being configured to transmit the rotation to the output shaft while engaging the at least two of the second rotor teeth with the output tooth row at each of the places existing at both sides between which the devotion central line intervenes.

12. The crown gear deceleration mechanism according to claim 7,
wherein the stator tooth row is formed to be engaged with the first rotor tooth row so that a difference in teeth number between the stator tooth row and the first rotor tooth row is zero, or the output tooth row is formed to be engaged with the second rotor tooth row so that a difference in teeth number between the output tooth row and the second rotor tooth row is zero.

* * * * *